United States Patent [19]

Huellwegen

[11] Patent Number: 5,105,440

[45] Date of Patent: Apr. 14, 1992

[54] METHOD AND APPARATUS FOR ADAPTIVE EQUALIZATION OF PULSE SIGNALS

[75] Inventor: Josef Huellwegen, Altenbeken, Fed. Rep. of Germany

[73] Assignee: Nixdorf Computer AG, Paderborn, Fed. Rep. of Germany

[21] Appl. No.: 359,656

[22] PCT Filed: Nov. 13, 1987

[86] PCT No.: PCT/EP87/00707

§ 371 Date: May 14, 1989

§ 102(e) Date: May 14, 1989

[87] PCT Pub. No.: WO88/03733

PCT Pub. Date: May 19, 1988

[30] Foreign Application Priority Data

Nov. 14, 1986 [DE] Fed. Rep. of Germany ....... 3638877

[51] Int. Cl.⁵ .............................................. H03N 7/30
[52] U.S. Cl. ........................................ 375/14; 333/18; 364/724.2
[58] Field of Search .......................... 375/11, 12, 13, 14; 328/164, 175; 333/17, 18, 28 R; 455/250, 245, 246, 247, 65; 364/724, 724.2

[56] References Cited

U.S. PATENT DOCUMENTS

| 3,356,947 | 12/1967 | Di Toro | 455/65 |
| 3,614,623 | 10/1971 | McAuliffe | 375/14 |
| 3,727,134 | 4/1973 | Melvin | 375/14 |
| 4,243,956 | 1/1981 | Lemoussu et al. | 333/18 |
| 4,404,681 | 9/1983 | Hullwegen | 375/11 |
| 4,580,176 | 4/1986 | Graves et al. | 375/11 |
| 4,584,696 | 4/1986 | Beeman et al. | 375/12 |
| 4,590,600 | 5/1986 | Beeman et al. | 375/12 |
| 4,669,092 | 5/1987 | Sari et al. | 375/14 |
| 4,775,984 | 10/1988 | Jaffre et al. | 375/11 |
| 4,839,905 | 6/1989 | Mantouani | 375/12 |

FOREIGN PATENT DOCUMENTS 0196549 3/1986 European Pat. Off. .
3210079 10/1982 Fed. Rep. of Germany .

OTHER PUBLICATIONS

Takatori "A New Equalization Scheme For Digital Subscriber Loops" National Telecommunication Conference, 29, Nov. 3, Dec. 1981, New Orlean U.S. IEEE.

Primary Examiner—Stephen Chin
Attorney, Agent, or Firm—Dykema Gossett

[57] ABSTRACT

A method and apparatus are provided for adaptive equalization of distorted pulse signals with different pulse train speeds, particularly for bipolar signals. The edge time deviations of a signal derived from the pulses output from a variable equalization network are determined relative to a reference signal, and the results are used to selectively enable or disable individual circuit elements of the network in order to minimize the deviations. The circuit elements are controlled by a clocked binary counter, the counting direction of which is changed depending on the determined edge deviation change. The degree of equalization thusly achieved may be predetermined by presetting the count reading of the counter.

26 Claims, 7 Drawing Sheets

METHOD AND APPARATUS FOR ADAPTIVE EQUALIZATION OF PULSE SIGNALS

TECHNICAL FIELD

This invention relates to a method for adaptive equalization of pulse signals, particularly bipolar pulse signals, in which a pulse signal is analyzed with regard to its distortion and the result of the analysis controls a variable equalization network with respect to its transmission characteristics.

BACKGROUND ART

In order to ensure during transmission of digital data that the transmission channel, normally having a capacitive component, is not charged up to a d.c. voltage value, the digital data are usually transmitted in an AMI-code or in form of a bipolar (=pseudoternary) pulse train for which the logical characteristic state 0 is represented by the signal voltage +U or −U with alternating polarity, for every successive 1-bit. Thereby, for an alternating sequence of logical 0 and 1 states in the pulse train, there is a smaller signal change or pulse train rate than for directly successive logical 1 states.

Due to the frequency dependent transmission characteristic of data transmission channels, digital pulse signals with different pulse train rates are often distorted during transmission to such a degree that at the end of the transmission path they can no longer be recognized as such. In order to regenerate the digital data, the transmitted digital pulse signals must first of all be equalized before they can be fed to a pulse shaper. For the automatic equalization of the distorted digital signals, generally an adaptive equalizer which automatically adapts its equalization characteristic to the unknown and often variable transmission characteristic of the transmission channel is used. Such an adaptive equalizer essentially consists of the variable and adaptable equalization network and a circuit arrangement controlling the equalization network.

The above discussed type of circuit arrangement for adapting the equalization network of an adaptive equalizer for digital pulse signals is already West German Patent Publication No. 29 08 588. It comprises a predistortion filter, an operational-sign-coincidence-auto correlator, and a correction circuit to guarantee control stability. This known circuit, however, has the disadvantage that it is very complicated in design, due particularly to the use of a sign-coincidence-auto correlator, so that on the one hand it is susceptible to functional errors and on the other hand it is expensive to produce.

SUMMARY OF THE INVENTION

It is an object of the present invention to provide a simple and reliable method and apparatus for adaptive equalization of distorted digital pulse signals with different pulse train speeds, particularly for bipolar signals.

This object is achieved according to the invention by the fact that, for the analysis of the pulse signals, the edge time deviations of a signal derived from pulses occurring at the output of the variable equalization network relative to a reference signal are determined and that, depending on the determined edge deviations, individual network parts are enabled or disabled for the purpose of minimization of the edge deviations.

During the transmission of digital pulse signals with changing pulse train speed, particularly bipolar signals, via a transmission channel with frequency dependent transmission characteristics, the pulse edges of the digital signals are time shifted with varying degrees relative to the original signals, which is due to the continuous change of the spectral structure of the pulse signals.

The invention is based on the knowledge that this highly differing shifting of the individual pulse edges of the digital signals indicates the level of distortion of the digital signals and hence can be evaluated for control of the variable transmission network for the purpose of optimizing the degree of equalization.

The method according to the invention is particularly well-suited for the equalization of bipolar pulse signals. As has been already described above, bipolar pulse signals can involve signal changes which vary greatly in amplitude. So, on the one hand, symmetrical bipolar pulse signals can have signal changes with the amplitude U, and on the other hand, changes with the amplitude 2U. These greatly differing signal changes take place with very different pulse train or signal changing speed. The result of this is that the pulses of bipolar pulse signals show particularly large edge time deviations with respect to the original pulses in transmission via a transmission channel with frequency dependent transmission characteristics. These edge deviations can, however, be easily determined and can be evaluated for control of the variable equalization network.

The control of the variable equalization network with regard to its transmission characteristics is simply effected by the invention by enabling or disabling individual network parts. This type of control of the variable equalization network also facilitates the use of simply designed and thus inexpensive equalization networks.

In one advantageous embodiment of the invention, the determined edge deviations of successive pulses or pulse trains are compared with each other in order to determine an edge deviation increase or decrease. In the event of a determined edge deviation increase, network parts, each with a greater equalization effect than their predecessors, are successively enabled until the resulting effect of a decreasing edge deviation is reversed. Thereby, the degree of equalization of the variable equalization network reaches its optimum value.

The step-by-step enabling or disabling of network parts is preferably controlled by a clocked binary counter, the counting direction of which is changed depending on the determined edge deviation change.

The clock pulse for the binary counter can be generated by means of a clock circuit, the clock frequency of which is switchable depending on the states of the counter output signals of the binary counter in such a way that at counter readings, for which the enabling or disabling of network parts controlled by the binary counter has only a minor influence on the equalization degree of the variable equalization network, it is switched over to a clock frequency higher than a standard counting clock frequency. The counting process can, for example, be accelerated for a small counter reading and slowed down for a high counter reading.

In order to avoid the counter changing from its maximum counter reading to its minimum counter reading or vice versa, the counting direction of the binary counter can be changed upon reaching the maximum or minimum counter reading.

It is commonly desired that the equalization degree of the variable equalization network is presettable. In an embodiment of the invention suitable therefor, the enabling or disabling of the network parts for presetting the equalization degree of the variable equalization network is easily achieved by presetting the counter reading of the binary counter.

The enabling or disabling of network parts is advantageously carried out by semiconductor switches, as these can be controlled simply by the outputs of the binary counter.

In a preferred embodiment of the invention, the pulse signals occurring at the output of the variable equalization network are subjected to pulse shaping prior to analysis. Thereby, the pulse signal is compared with an upper and/or lower threshold value and a so-called regenerated or new shaped pulse signal is generated depending on the result of the comparison. A bipolar pulse signal can, however, be converted to binary data already during pulse shaping.

The signal derived from the analysis of the pulse signal for determination of the edge deviations and the reference signal are generated by means of clock generators (clock recovering circuits) in a further embodiment of the invention, which are started by the first pulse of a transmission block to be equalized and are (re-) synchronized with different time constants.

In order to determine edge deviations, the pulse signal is supplied to both clock generators (clock recovering circuits), and their output signals are checked with regard to uniformity. If a strong edge deviation change arises in the pulse signal, one clock generator adapts itself to the shifted edge almost free from delay. The other generator, delivering the reference signal, only adapts after a relatively long delay to the shifted pulse edge. These differences can be used for determination of the edge deviation by means of a coincidence circuit.

The pulse signal indicating the edge deviation is integrated to a d.c. voltage signal for the purpose of easier evaluation, since this d.c. voltage signal can be simply converted to a digital value.

In another embodiment of the invention, the analog/digital conversion is carried out with various reference voltages and conversion of the comparison result to a digital value. This type of analog/digital conversion excells by its high conversion speed. The respective digital value is transferred first with the respective positive edge of a transfer clock pulse to a first memory register and then with the negative edge to a second memory register, and with the positive signal edge of the next following transfer clock pulse the next digital value is transferred to the first memory register, and the contents of both memory registers are then compared for determination of an edge deviation increase or decrease. If the comparison result is that, for example, the digital value in the first memory register is greater than the digital value in the second memory register, then there is an edge deviation increase. This comparison result indicates that the equalization degree of the variable equalization network is set too low and must therefore be increased.

According to another embodiment of the invention, in order to determine an edge deviation increase or decrease, the d.c. voltage signal, which indicates the edge deviation, is compared simultaneously with various reference voltages, and a signal, which indicates an edge deviation increase, is only generated if any one of the reference voltages is exceeded by the d.c. voltage signal.

A circuit for performing the above described method comprising an analysis device for analyzing the pulse signal with regard to its distortion and a control device for controlling the variable equalization network, in a further embodiment of the invention is designed such that the analysis device comprises a device for determining edge deviation changes and a further device for determining the operational sign of the determined edge deviation change (increase or decrease), and that the control device comprises a clocked binary counter, the counting direction of which is changed at edge deviation increase determined by the analysis device and the output signals of which control the enabling or disabling of the individual network parts of the variable equalization network.

In a preferred embodiment of the invention, ohmic resistors are provided as network parts which can be enabled or disabled, whereby the resistance values of two adjacent resistors differ by factor 2, respectively. In the case of an 8-bit binary counter, the equalization degree of the variable equalization network can be changed to a considerable degree by enabling or disabling of individual ohmic resistors.

In a favorable embodiment of the invention, the device for determining the operational sign of the determined edge deviation change comprises an analog/digital converter operating according to the parallel principle, the outputs of which are connected with the inputs of the first of two memory registers connected in series, an inverter which inverts the transfer clock pulse of the first memory register prior to transferring it to the second memory register, and a comparator for comparing the output signals of both memory registers.

In this device, an analog d.c. voltage signal, which indicates the edge deviation change, is converted to a digital value. This digital value is loaded with the rising clock edge into the first memory register and from there with the falling clock edge into the second memory register. With the rising edge of the next transfer clock pulse, the next digital value is loaded into the first memory register. Even before this second digital value is loaded into the second memory register, the contents of both memory registers are compared with each other. If it appears that the second digital value is larger than the first one, there is an edge deviation increase. This comparison result is then used for controlling the variable equalization network, i.e. for controlling the enabling or disabling of individual network parts for the purpose of minimizing the edge deviations or of increasing the equalization degree of the variable equalization network.

In another embodiment of the circuit arrangement according to the invention, the device for determining the operational signal of the determined edge deviation change comprises a series of parallel-operated comparators which are each connected on the output side via a capacitor over a resistor with a positive potential and via an inverting Schmitt trigger with an input of a disjunctive logic element, the output of which is connected with a further Schmitt trigger.

In this device, the d.c. voltage signal which indicates the determined edge deviation is supplied simultaneously to all comparators. At the output of a comparator, a pulse then only occurs, if the d.c. voltage signal exceeds the reference voltage of this comparator in the positive direction. Since the output signals of the comparators are interconnected by means of the disjunctive logic element, a pulse appears at the output of this disjunctive logic element if any one of the reference voltages of the comparators is exceeded in a positive direction by the d.c. voltage signal. This output pulse is transformed into a rectangular pulse by a further Schmitt trigger. If such a rectangular pulse appears at the output of this device, this indicates that the edge deviation has increased.

BRIEF DESCRIPTION OF THE DRAWINGS

The invention will be described with reference to the accompanying drawings, wherein.

DESCRIPTION OF THE PREFERRED EMBODIMENT

Figure 1:
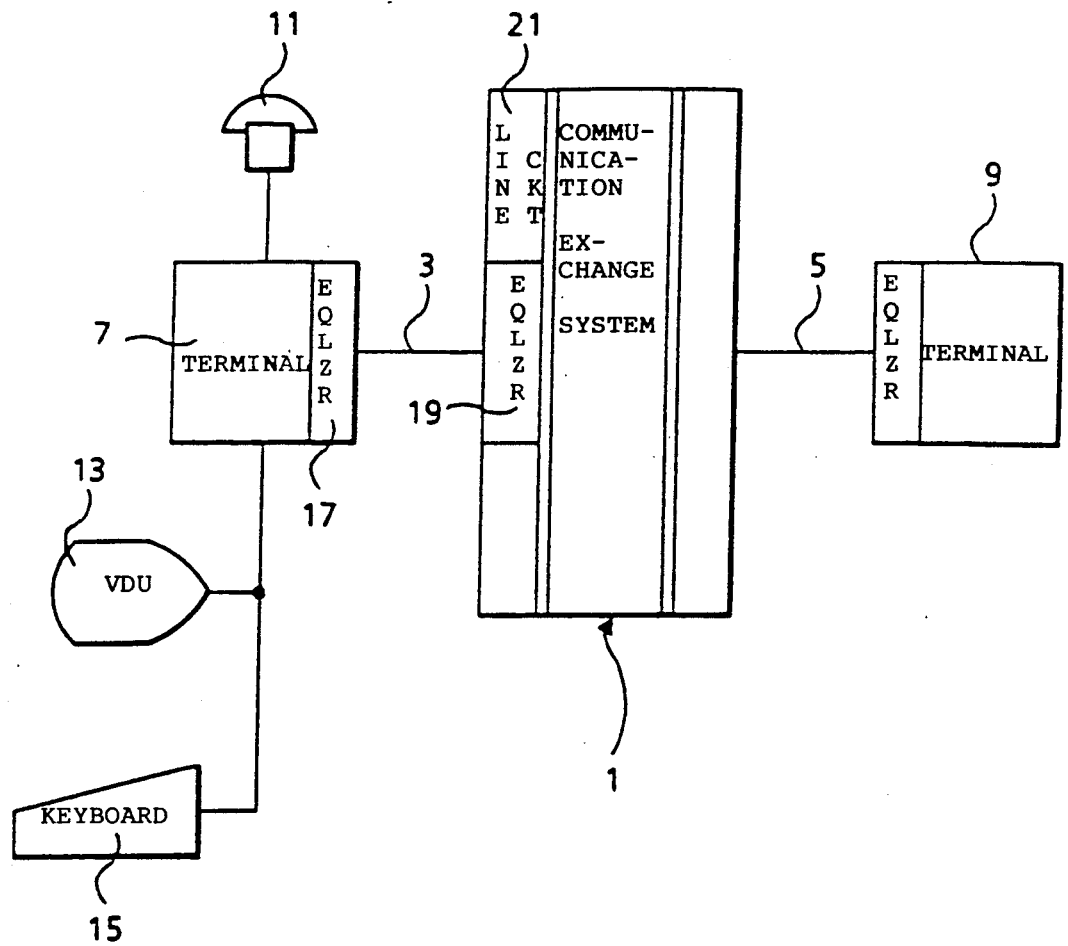
FIG. 1 depicts a practical example of an adaptive equalizer operating according to the invention.

In FIG. 1 a practical example of the adaptive equalizer according to the invention is shown for the equalization of line distorted digital pulse signals. A digital telephone and data communication exchange system, which as a whole is designated by the reference character 1, is shown to which via two-wire lines 3 and 5 subscriber terminals 7 and 9 are connected onto which a telephone 11 and a data terminal with visual display unit 13 and keyboard 15 can be operated. The two-wire lines 3 and 5 can be of different lengths, cross-sections, and capacitances, so they can be different with regard to their ohmic resistance and their series capacitance as well as their low-pass characteristics. The distortions of the transmitted digital pulse signals resulting from the low-pass characteristics of the transmission lines 3 and 5 are equalized during a data transmission from the digital telephone and data communication exchange system 1 to the subscriber terminal 7 by an adaptive equalizer 17. For data transmission from the subscriber terminal 7 to the digital telephone and data exchange 1, another adaptive equalizer 19 is provided for carrying out this function. This equalizer is part of a digital subscriber line circuit 21 which is located between the transmission line 3 and the actual telephone and data communication exchange 1. Between one subscriber terminal 7 or 9 and the digital telephone and data communication exchange 1, digital speech and data streams are transmitted over the two-wire line 3 or 5 with a data rate of 512 kilobits per second. The data transmission takes place in form of data blocks of 20 bits in length, alternately from and to the subscriber terminal 7 or 9.

Figure 2:
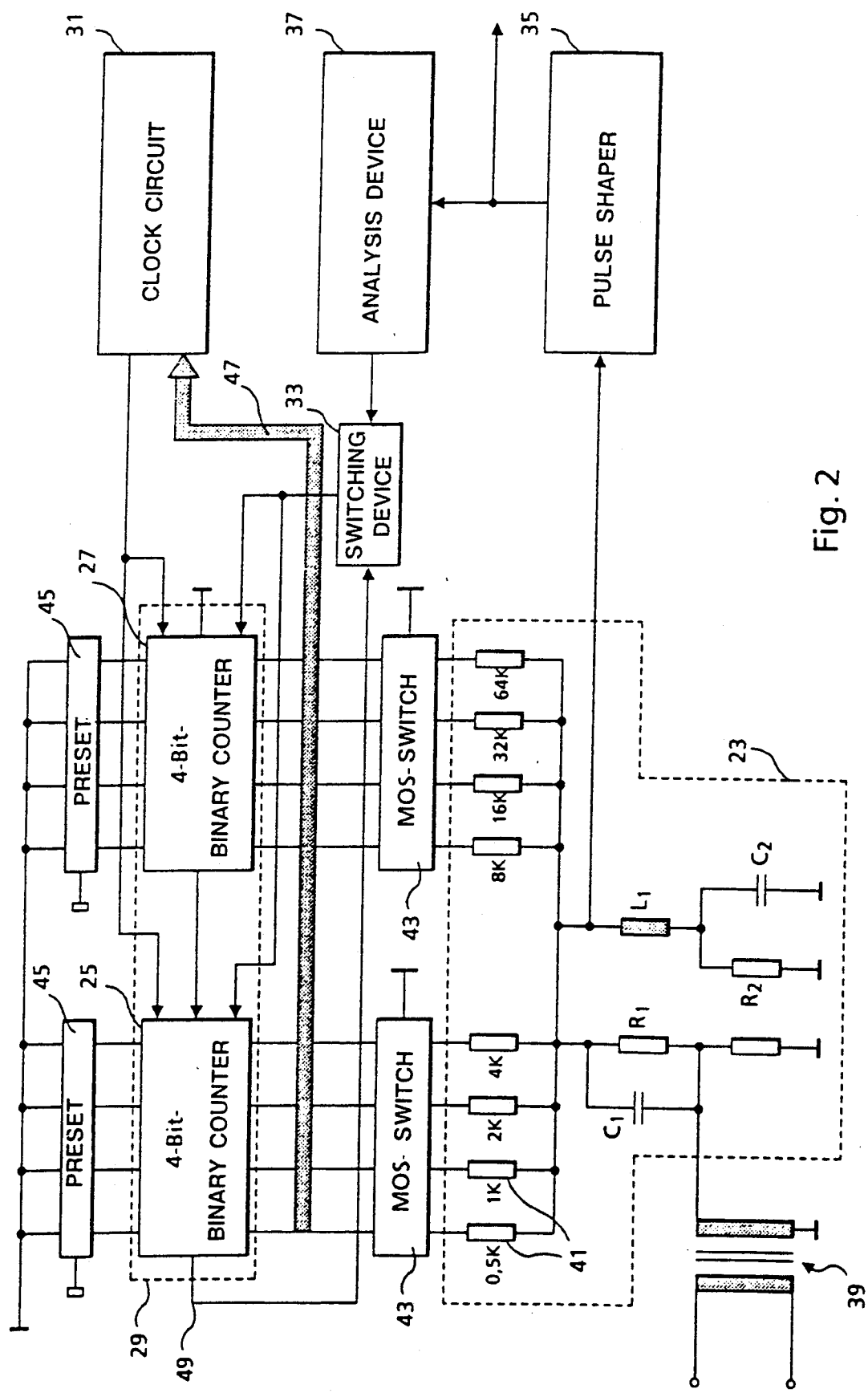
FIG. 2 is a block diagram of an embodiment of the adaptive equalizer.

FIG. 2 shows an adaptive equalizer. It consists essentially of an adaptable equalization network 23, an 8-bit binary counter 29 consisting of two 4-bit binary counters 25 and 27, a clock circuit 31, a switching device 33, a unit 35 for pulse signal regeneration or a pulse shaper and an analysis device 37. At the input of the adaptive equalizer, a decoupling transformer 39 is provided for decoupling the pulse signals to be equalized. One end of its secondary winding is connected to the adaptable equalization network 23. This forms a frequency dependent voltage divider with a $R_1$-$C_1$-parallel circuit and a $L_1$-$R_2$-$C_2$ combination, by which low frequency signal parts can be attenuated more strongly than high frequency signal parts. In parallel with the $L_1$-$R_2$-$C_2$ combination, a series of ohmic resistors 41 is provided, the resistance values of which are each increased from left to right by factor 2. Individual ohmic resistors 41 can be connected with ground potential by means of MOS-semiconductor switches 43. These MOS-semiconductor switches 43 are controlled by the output signals of the 8-bit binary counter 29. The 8-bit binary counter 9 can be set by a presetting device 45. The clock inputs of the 4-bit binary counters are connected to the output of the clock circuit 31, by means of which the clock frequency can be switched depending on the counter output readings transmitted on a signal path 47. The counting direction of the 8-bit binary counter 29 can be switched by means of the switching device 33. The switching device 33 receives an input signal either from the overflow output 49 of the 8-bit binary counter 29 or from the analysis device 37. This results in the switching device 33 switching the 8-bit binary counter 29 if the reading has reached either its maximum or minimum value. Thereby, that the 8-bit binary counter is prevented from changing from maximum value to its minimum value or vice versa. In addition, the counting direction of the 8-bit binary counter 29 is changed by the switching device 33, if an increase in the distortion of the pulse signal is determined by the analysis device.

In the following, the functions of the adaptive equalizer shown in FIG. 2 will be explained.

The pulse signal which occurs above the decoupling transformer 39 at the input is supplied to the adaptable equalization network 23. The pulse signal is tapped off the output of the adaptable equalization network 23 and transferred to the pulse shaper 35. In this unit, the pulse signal is compared with an upper and/or lower threshold value. Depending on this comparison result, a so called regenerated pulse signal is generated. A bipolar or pseudoternary pulse signal is furthermore converted to binary data in the pulse shaper 35. By means of the analysis device 37 an increase of the edge deviations of the signal derived from the input pulse relative to a reference signal is determined and a corresponding signal is supplied to switching device 33. By this device, the counting direction of the 8-bit binary counter 29 is changed. Since an edge deviation increase is due to incorrect setting of the adaptable equalization network 23, by changing the counting direction of the 8-bit binary counter 29 the setting of the adaptable equalization network 23 is effected. The degree of equalization of the adaptable equalization network 23 is now changed to the correct direction until the optimum equalization degree is exceeded. After exceeding the optimum equalization degree, another change of the counting direction of the 8-bit binary counter 29 takes place so that the equalization degree is now reduced until it is once more below the optimum equalization degree. Thus, the setting of the equalization network 23 fluctuates permanently around the optimum value of the equalization degree.

Since the change of the equalization degree of the adaptable equalization network 23 due to the selected resistance values of resistors 41 occurs non-linear, the clock frequency can be changed by means of the clock circuit 31. Since by enabling or disabling resistors 41 with small resistances the equalization degree of the adaptable equalization network 23 can only be changed slowly, these resistance values can be enabled or disabled with a higher clock frequency. Thus, an almost continuous change of the equalization degree of the adaptable equalization network 23 can be achieved.

Figure 3:
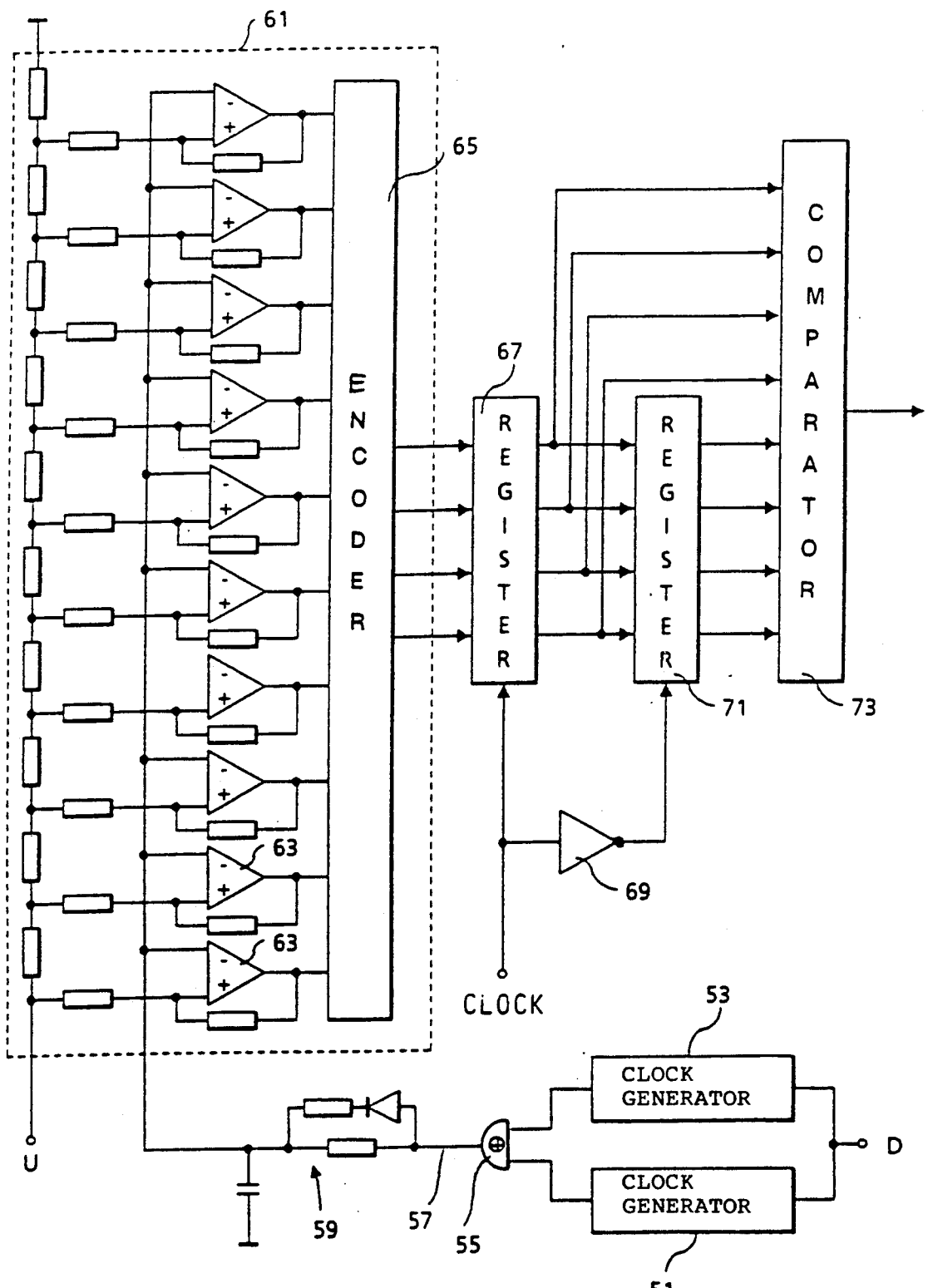
FIG. 3 depicts a first embodiment of an analysis device arranged in the adaptive equalizer.

In FIG. 3, a first embodiment of the analysis device 37 as shown in the block diagram of FIG. 2 is given in detail. It comprises two clock generators (clock recovery circuits) 51 and 53, one of which adapts itself for possible edge deviations of the regenerated pulse signal D with only a short delay in time and the other with a long delay in time. The output signals CLK2 and CLK1 of both clock generators (clock recovery circuits) 51 and 53 are interconnected by an EXCLUSIVE-OR element 55. Since, in the event of edge deviation changes, an output signal change will already be carried out by the faster acting clock generator (clock recovery circuit), whereas such a signal change is not yet effected by the slower acting clock generator (clock recovery circuit), a pulse-like signal appears at the output 57 of the EXCLUSIVE-OR element 55 which is integrated to a d.c. voltage signal by an integration circuit 59. This signal is converted to a digital value by an analog/digital converter 61 which operates according to the parallel principle. The analog/digital conversion is effected by simultaneous comparison of the d.c. voltage signal with various reference voltages by means of comparators 63 and by conversion of the comparison result to the digital value by means of an encoder 65. The digital value appearing at the outputs of the analog/digital converter 61 is loaded with the positive clock edge into a first memory register 67. Since the clock pulse is inverted by an inverter 69, the digital value contained in the first memory register 67 is loaded with the negative clock edge of the clock pulse into a second memory register 71. With the positive edge of the next clock pulse the next digital value is loaded from the outputs of the analog/digital converter 61 into the first memory register 67. Before this second digital value is loaded by the negative clock edge into the second memory register 71, the contents of both registers 67 and 71 are compared by a comparator 73. If the value contained in the first memory register 67 is greater than the digital value contained in the second memory register 71, there is an edge deviation increase. Since an edge deviation increase is due to a rising eror setting in the adaptable equalization network 23 (FIG. 2), the counting direction of the 8-bit binary counter 29 (FIG. 2) is reversed by the output signal of the comparator 73. The result of this counting direction change is that the adaptable equalization network 23 (FIG. 2) is now set in the right direction, namely in the direction of an optimum equalization degree.

Figure 4:
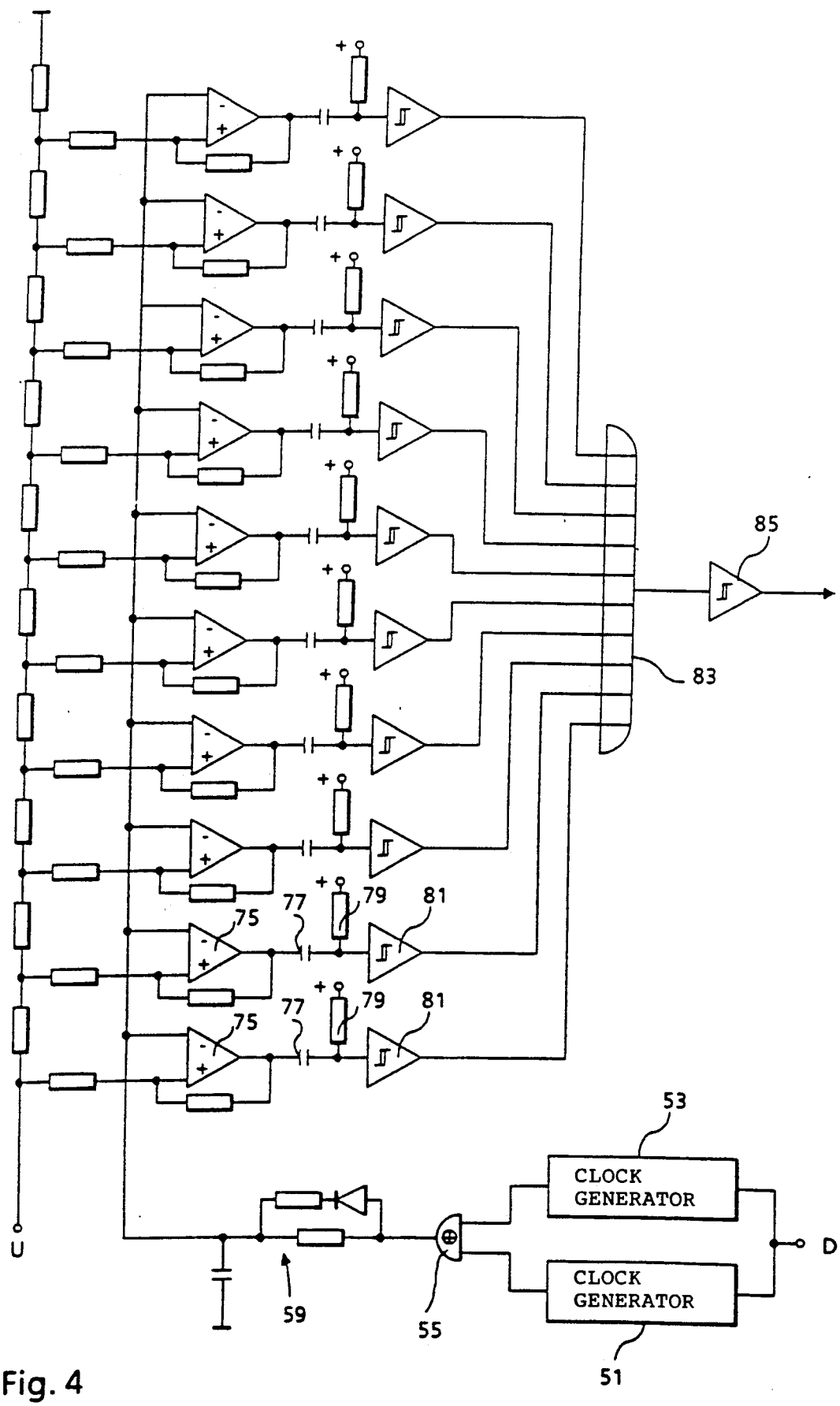
FIG. 4 depicts a second embodiment of the analysis device.

In FIG. 4, a second embodiment of the analysis device 37 of FIG. 2 is shown. This embodiment corresponds to the embodiment shown in FIG. 3 with regard to both clock generators (clock recovery circuits) 51 and 53, the EXCLUSIVE-OR element 55 and the integration circuit 59. In this embodiment, also, the d.c. voltage signal appearing at the output of the integration circuit 59 is simultaneously fed to a series of comparator 75. Since these comparators 75 are, at their outputs, each connected via a capacitor 77 over a resistor 79 to a positive potential and to the input of an inverting Schmitt trigger 81, a pulse only appears at the output of the respective inverting Schnmitt trigger 81, if the respective reference voltage is exceeded by the d.c. voltage signal in a positive direction. The Schmitt triggers 81 have a switching hysteresis which avoids switching too frequently. Since the outputs of the Schmitt triggers 81 are connected by a disjunctive logic element 83, a pulse occurs at the output of the disjunctive logic element 83, when a pulse appears at any one of the Schmitt triggers 81. A pulse appearing at the output of the disjunctive logic element 83 is fed to a further Schmitt trigger 85 for the purpose of signal shaping.

By this analysis device it is achieved that if one of the comparator threshold values is exceeded by the d.c. voltage signal, a pulse will be generated at the output of the Schmitt trigger 85, whereas, if the d.c. voltage signal falls below a reference voltage, no pulse occurs. Only if there is an increasing d.c. voltage signal, is the counting direction of the 8-bit binary counter 29 (FIG. 2) changed. On the other hand, the effect of this change is that the equalization degree of the adaptable equalization network 23 (FIG. 2) is set in the correct direction, namely in the direction of an optimum equalization degree.

In order to explain the function of the adaptive equalizer according to the invention, FIGS. 5a to 5f show the signal flow of a pulse signal at different points of the transmission path from a digital telephone and data exchange device to a subscriber terminal.

Figure 5:
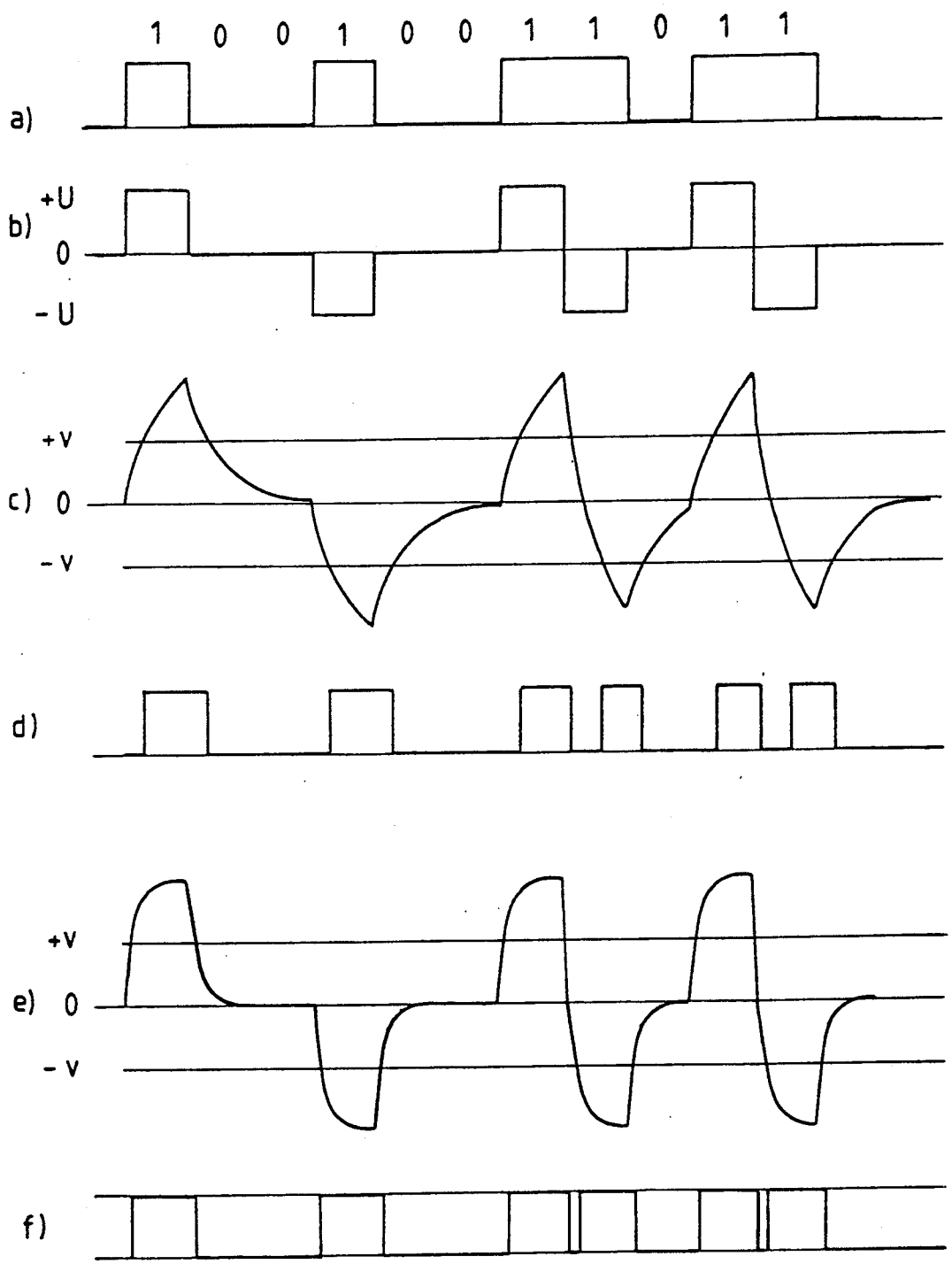
FIG. 5 shows the flow of signals; for better understanding the functions of the adaptive equalizer.

FIG. 5a shows a section of a data block which is to be transmitted from the digital telephone and data exchange. In FIG. 5b the signal flow of this section is shown after converting to the AMI code. By this signal, the two-wire line 3 (FIG. 1) is controlled. FIG. 5c shows the signal flow at the output of the equalization network 23 for a non-optimum equalization. The lines +v and −v indicate the upper and lower threshold value of the pulse shaper 35. In FIG. 5d, the resulting output signal of the pulse shaper 35 is described which is similar to the data block section shown in FIG. 5a.

The signal flow in FIG. 5e results from an equalization with a better setting than in FIG. 5c. This results in a corresponding output signal of the pulse shaper 35, shown in FIG. 5f, which is much more close to the section of the data block shown in FIG. 5a. By this operation the effect of the equalizer according to the invention onto the input signal of the pulse shaper 35 becomes evident.

Figure 6:
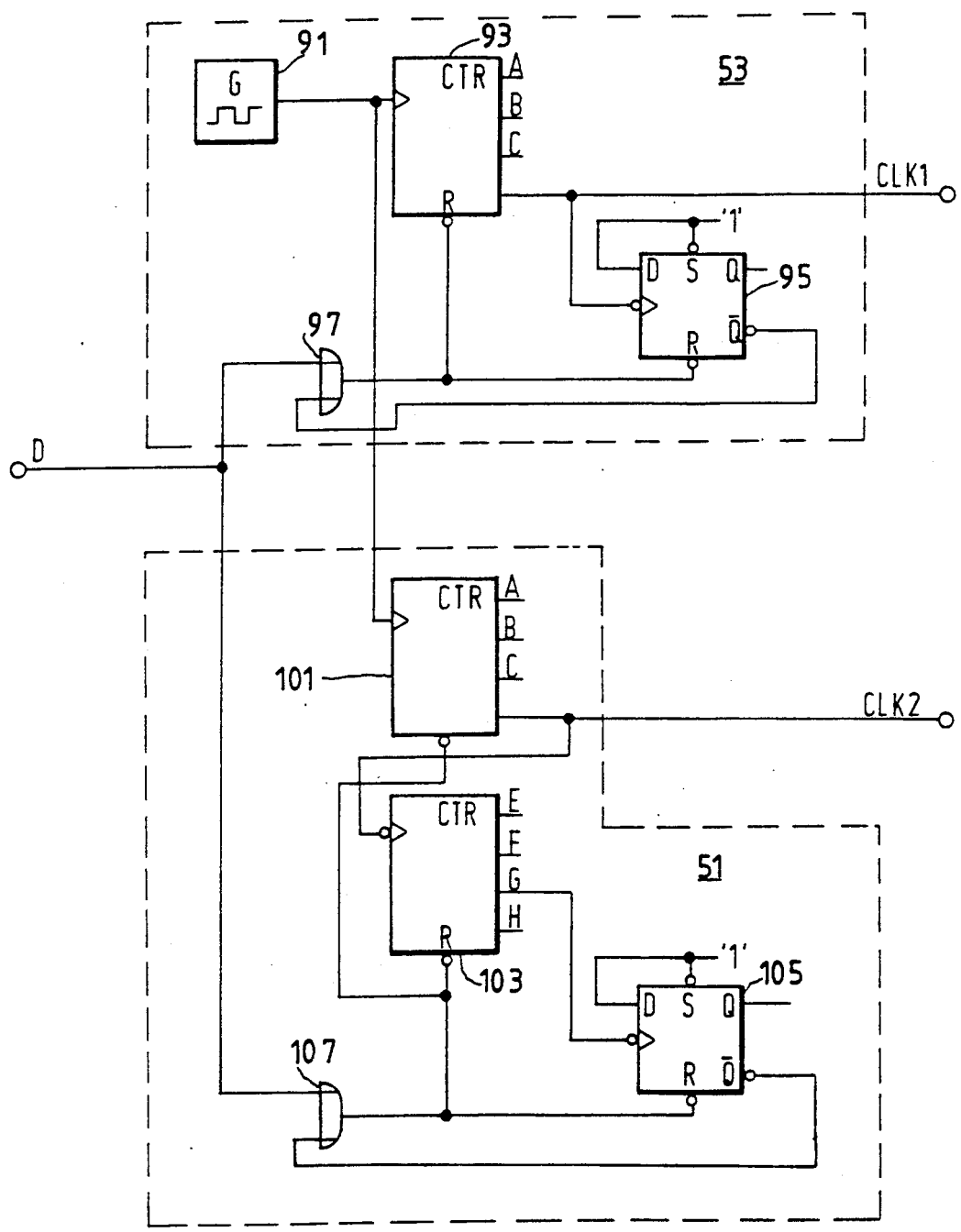
FIG. 6 depicts the clock recovery circuits inside the analysis device.

FIG. 6 shows one possible embodiment of the two clock recovery circuits 51 and 53 shown in FIG. 3 and 4. The clock signal for both clock recovery circuits 51 and 53 is generated by a generator 91, whose output is connected with the clock inputs of two 4-bit binary counters 93 and 101 and which operates with a clock frequency of 16 times the data transmission rate. The output signal of the highest counter stage of the first 4-bit binary counter 93 is the output signal CLK1 of the clock recovery circuit 53 and is simultaneously connected with the clock input of flip-flop 95 which is settable with negative edges. This flip-flop 95 is resettable with a logical "0" signal at its reset input R. Therefor, this input, like the reset input of the 4-bit binary counter 93, is connected with the output of an OR element 97 whose inputs are connected with the input D or with the inverting output $\overline{Q}$ of flip-flop 95. By this combination, a reset signal is generated, when at input D an "0" signal appears and flip-flop 95 is set.

The 4-bit binary counter 101 is connected with a further 4-bit binary counter 103 so that they together constitute a 8-bit binary counter. The output signal CLK2 of the clock recovery circuit 51 is supplied by the output of the fourth counter stage, the output signal of the seventh counter stage is the clock input signal for a flip-flop 105. The reset circuit for the 8-bit binary counter and the flip-flop 105 correspond to the reset circuit of the clock recovery circuit 53 and comprise an OR element 107 which is controlled via input D and the inverting output $\overline{Q}$ of the flip-flop 105.

Figure 7:
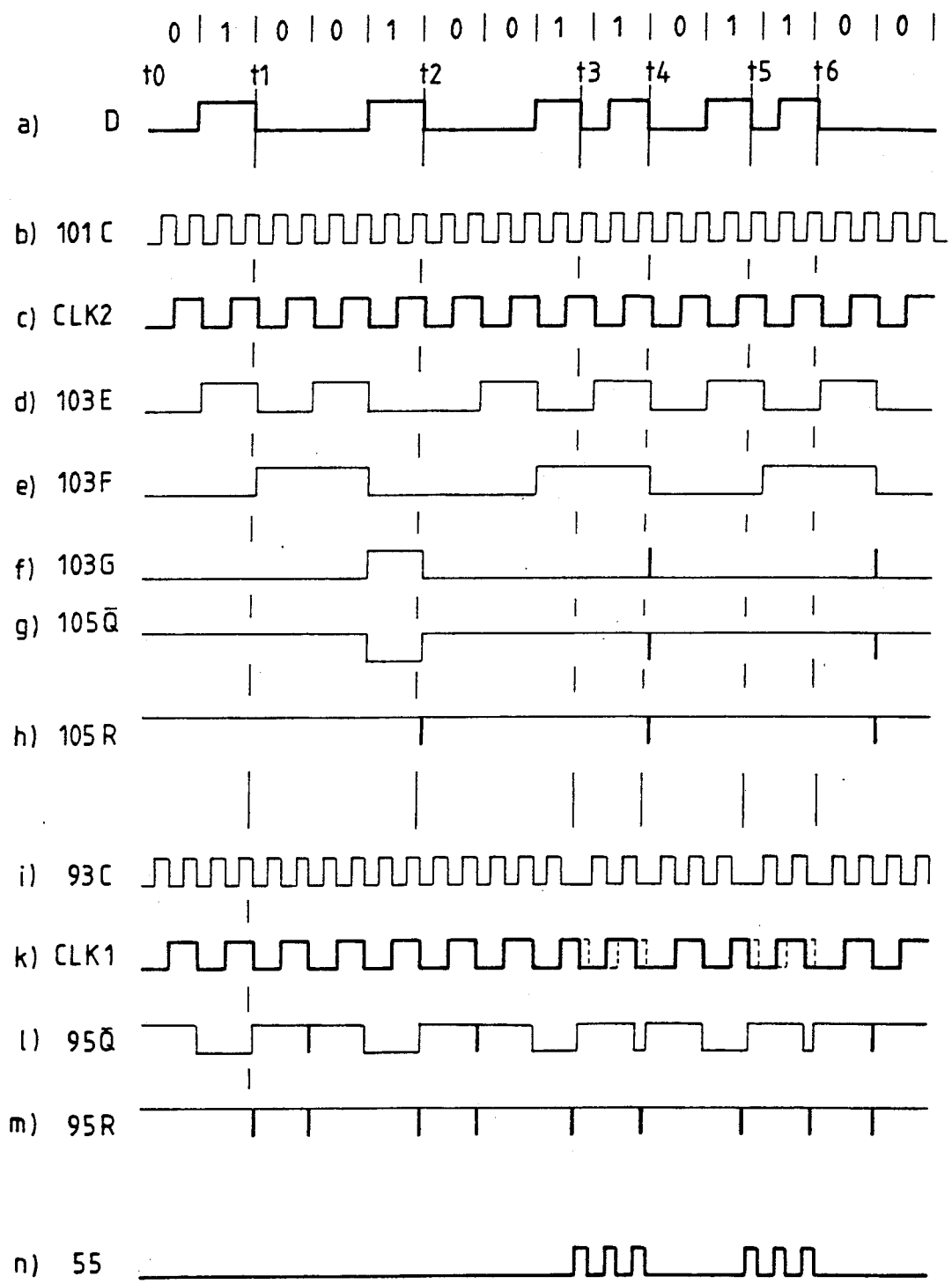
FIG. 7 shows the flow of signals in the circuits according to FIG. 6.

In FIG. 7 the reaction of the two clock recovery circuits 51 and 53 is shown with an input signal according to FIG. 5d at the input D. The following description is based on the fact that at time t0 all counters and flip-flops are reset.

In FIG. 7a the input signal is shown with points of time t0 to t6 and in its logical states "1" and "0". FIG. 7b and d show the output signals at the output C of counter 101 and at output E of counter 103.

With the first decreasing edge at output F of the 4-bit binary counter 103 (FIG. 7e), i.e., after 4 data bits, the following output G (FIG. 7f) and the flip-flop 105 (FIG. 7g) are set. This state of flip-flop 105 remains stable until the input data at input D (FIG. 7a) changes to state "0" at moment t2 and therewith the reset condition of the clock recovery circuit 51 is met (FIG. 7h). By this reset, depending on the decreasing edge of the data at input D, the output CLK2 (FIG. 7c) of the clock recovery circuit 51 is synchronized with the input data. After a further 4 data bits, the reset condition is met immediately at the point of time t4, as the input data at input D (FIG. 7a) and the inverting output $\overline{Q}$ of flip-flop 105 (FIG. 7g) simultaneously take on the state "0". After the following 4 data bits the reset conditions also are met immediately since the input data at input D has already the state "0".

This clock recovery is always synchronized with the decreasing edge of the input data when 4 data bits following the last reset have the state "1". The number of data bits between two possible synchronization moments is determined by the number of counter stages between the output CLK2 of the counter 101 and the output of counter 103 which controls the flip-flop 105.

In order to generate a reference signal for received signals, the distance between two possible synchronization moments is to be chosen with the greatest possible value. This value is then limited by the possible frequency deviation between the transmitter (telephone exchange device 1) and the generator 91 to a maximum value.

In opposition thereto, the clock recovery circuit 53 is switched so that every decreasing edge of the input signal can be a synchronization moment. This circuit reacts immediately on time differences of the decreasing edge of input data relative to their expected point of time. Thus, at every point of time t1 to t6 (FIG. 7a), the output CLK1 (FIG. 7k) of the clock recovery circuit 53 is resynchronized with the input data. In the signal flow of CLK1 (FIG. 7k) the flow of CLK2 is indicated by a dashed line as "expected" flow or reference value.

Furthermore, for the clock recovery circuit 53 signal flows as given for the clock recovery circuit 51 are shown. FIG. 7i and 1 show the output signals at the output C of the counter 93 and at the inverting output $\overline{Q}$ of flip-flop 95. FIG. 7m shows the signal flow at the reset inputs of counter 93 and flip-flop 95.

The signal flow of FIG. 7n shows the output signal of the EXCLUSIVE-OR element 55 (FIG. 3 and 4) which connects the two signals CLK1 and CLK2.

The binary counters 93, 101, 103 as shown in FIG. 6 individually or combined constitute a frequency divider.

I claim:

1. A method for adaptive equalization of pulse signals, of the type in which the distortion of a pulse signal is analyzed and the analysis results are employed to control the transmission characteristics of a variable equalization network used in equalizing said signals and wherein said network includes an output for providing output pulses, said method comprising the steps of:
   (A) deriving a signal from said output pulses;
   (B) determining the edge time deviations of the signal derived in step (A) relative to a reference signal; and
   (C) selectively enabling or disabling, based on the results of the determination mode in step (B), portions of said network in order to minimize said edge time deviations, wherein said method further includes the steps of;
   generating said derived signal and said reference signal using clock generators;
   starting said clock generators using the first pulse of a train of said output pulses; and
   synchronizing said clock generators to said output pulses in accordance with a plurality of differing time constants.

2. The method of claim 1, wherein step (B) is performed by successively enabling circuit components of said network portions, each of the components providing a greater equalization effect than its predecessor components, until the edge time deviation is reduced to a desired degree.

3. The method of claim 1, wherein step (C) is performed by:
   changing the count of a counter in a counting direction dependent on changes in the edge time deviation determined in step (B); and
   controlling the enabling or disabling said network portions using a clocked binary counter.

4. The method of claim 2, wherein step (C) is performed by:
   changing the count of a counter in a counting direction dependent on changes in the edge time deviation determined in step (B); and
   controlling the enabling or disabling said network portions using a clocked binary counter.

5. The method of claim 3, wherein step (C) is performed by generating clock pulses for said counter using a clock circuit, switching the clock frequency of said clock circuit in accordance with the state of the signals output by said counter such that at readings of said counter at which enabling or disabling of said network portions has only relatively minor influence on the degree of equalization of said pulse signals, said clock frequency is switched to a higher-than-normal frequency.

6. The method of claim 3, wherein step (C) includes the steps of establishing a maximum or minimum count for said counter, and the count direction changing step is performed when the count in said counter reaches said maximum or minimum count.

7. The method of claim 3, wherein step (C) is performed by presetting the counter reading of said counter in order to preset the desired degree of equalization of the equalization network.

8. The method of claim 1, including the steps of:
   shaping said output signals prior to performing said analysis,
   comparing said output signals with an upper or lower threshold value, and regenerating pulse signals in accordance with the results of the comparison of said output signals with said threshold value.

9. The method of claim 8, including the step of converting said output signals to binary data during said shaping.

10. The method of claim 1, including uniformly clocking said clock generators.

11. The method of claim 1, including the steps of:
generating a signal indicating said edge time deviations; and
integrating said edge time deviation indicating signal into a d.c. voltage signal.

12. The method of claim 11, including the steps of converting said d.c. voltage signal to a digital value.

13. The method of claim 12, wherein:
said converting is performed by simultaneously comparing said d.c. voltage signal with a plurality of reference voltages and then converting the results of the comparison to said digital value;
loading said digital value along with a respective positive edge of a transfer clock pulse into a first memory register;
loading said digital value along with a respective negative edge of a transfer clock pulse into a second memory register; and
comparing the contents of said first and second memory registers to determine an edge deviation increase or decrease.

14. The method of claim 11, including the steps of:
determining an edge deviation increase or decrease by comparing said d.c. voltage signal with each of a plurality of referecnce voltages; and
generating a signal indicating an edge deviation increase only when one of said reference voltages is exceeded by said d.c. voltage.

15. Apparatus for use in adaptive equalization of pulse signals, wherein the distortion of a pulse signal is analyzed by an analysis device and the analysis results are employed to control the transmission characteristics of a variable equalization network used to equalize said pulse signals, said apparatus comprising:
first means for determining edge time deviations of said pulses;
second means for determining whether the edge time deviations determined by said first means represents an increase or decrease in edge time; and
control means for controlling said variable equalization network, including a clocked binary counter outputting signals for controlling said network, said counter having a counting direction controlled by said second means.

16. The apparatus of claim 15, including ohmic resistors forming parts of said network and selectively enabled or disabled by said binary counter output signals.

17. The apparatus of claim 16, wherein the values of adjacent ones of said resistors differ by a factor of 2.

18. The apparatus of claim 15, including switching means coupled with said counter for changing the counting direction of said counter when said counter reaches a preselected minimum or maximum counter reading or in response to operation of said analysis device.

19. The apparatus of claim 18, wherein said switching means includes a bistable circuit.

20. The apparatus of claim 15, wherein said first means includes two synchronizable clock generators connected in parallel relationship with each other, and an exclusive OR logic device connected in series with said clock generators.

21. The apparatus of claim 15, wherein said second means includes:
an analog-to-digital converter having outputs;
first and second series connected memory registers, the inputs of said first register being connected with the outputs of said converter;
an inverter coupled between a source of clock signals and the clock input of said second register; and,
a comparator for comparing output signals from said first and second registers.

22. The apparatus of claim 15, wherein said second means includes:
a plurality of comparators operating in parallel;
a plurality of first inverting Schmitt triggers respectively associated with said comparators;
a plurality of RC circuits respectively coupled between the outputs of said comparators and said Schmitt triggers;
a second Schmitt trigger; and
a logic element coupling the outputs of said first Schmitt trigger with the input of said second Schmitt trigger.

23. The apparatus of claim 20, wherein one of said clock generators includes a first frequency divider and a first bistable circuit have a set input controlled by said frequency divider.

24. The apparatus of claim 23, wherein the other of said clock generators includes a second frequency divider providing an output clock signal, and a second bistable circuit settable by said output clock signal.

25. The apparatus of claim 23, wherein said first bistable circuit includes a reset input and there is further provided logic means couple between the inputs to said clock generators and said reset input.

26. The apparatus of claim 24, wherein said second bistable circuit includes a reset input and there is further provided logic means coupled between the inputs to said clock generators and said reset input.

* * * * *

UNITED STATES PATENT AND TRADEMARK OFFICE
CERTIFICATE OF CORRECTION

PATENT NO. : 5,105,440
DATED : April 14, 1992
INVENTOR(S) : Josef Huellwegen

It is certified that error appears in the above-identified patent and that said Letters Patent is hereby corrected as shown below:

Column 10, line 24, change "(B)" to --(C)--.

Signed and Sealed this

Twenty-second Day of June, 1993

Attest:

MICHAEL K. KIRK

*Attesting Officer*    Acting Commissioner of Patents and Trademarks